US012753065B2

(12) United States Patent
Poirier et al.

(10) Patent No.: US 12,753,065 B2
(45) Date of Patent: Oct. 6, 2026

(54) STRUCTURAL OPTIMIZATION METHOD FOR A FUEL SYSTEM FILLING ASSEMBLY

(71) Applicant: OPmobility C-Power Belgium Research, Woluwe-Saint-Lambert (BE)

(72) Inventors: Sylvain Poirier, Brussels (BE); Vincent Boutrelle, Brussels (BE)

(73) Assignee: OPmobility C-Power Belgium Research, Woluwe-Saint-Lambert (BE)

( * ) Notice: Subject to any disclaimer, the term of this patent is extended or adjusted under 35 U.S.C. 154(b) by 0 days.

(21) Appl. No.: 19/133,983

(22) PCT Filed: Nov. 29, 2023

(86) PCT No.: PCT/EP2023/083480
§ 371 (c)(1),
(2) Date: May 29, 2025

(87) PCT Pub. No.: WO2024/115539
PCT Pub. Date: Jun. 6, 2024

(65) Prior Publication Data
US 2026/0008665 A1 Jan. 8, 2026

(30) Foreign Application Priority Data
Nov. 30, 2022 (BE) .................................. 2022/5973

(51) Int. Cl.
*B67D 7/08* (2010.01)
*B60K 15/035* (2006.01)
*B60K 15/04* (2006.01)

(52) U.S. Cl.
CPC ............. *B67D 7/08* (2013.01); *B60K 15/035* (2013.01); *B60K 2015/03576* (2013.01); *B60K 15/04* (2013.01)

(58) Field of Classification Search
CPC ........ B67D 7/08; B60K 15/035; B60K 15/04; B60K 2015/03576; B60K 15/03519; B60K 15/03504; Y10T 137/86332
(Continued)

(56) References Cited

U.S. PATENT DOCUMENTS 5,282,497 A * 2/1994 Allison ............ B60K 15/03519 141/59
6,170,538 B1 1/2001 Devall
(Continued)

FOREIGN PATENT DOCUMENTS

CN 203688208 U 7/2014

OTHER PUBLICATIONS

International Search Report issued Mar. 4, 2024 in PCT/EP2023/083480, filed on Nov. 29, 2023, 2 pages.

*Primary Examiner* — Christopher M Afful
(74) *Attorney, Agent, or Firm* — Oblon, McClelland, Maier & Neustadt, L.L.P.

(57) ABSTRACT

The invention relates to a method for structural optimization of a filling assembly 1 of a fuel system 2.
According to the invention, such a method comprises the steps of filling the fuel system using the filling assembly 1, at a flow rate of a liquid 20, $Q_p$; of measuring of a gas flow rate 11, $Q_c$, at the outlet of the fuel vapor filtration device 7; of measuring a flow rate of gas heading towards the top of the tubing 12, $Q_r$, within the second vent line 8, of calculating flow rate of gas exiting the fuel tank 13, $Q_d$, using the relationship $Q_d=Q_c+Q_r$; of determining a flow rate of air 14 entering through the top 3 of the tubing, $Q_a$, using the relationship $Q_a=Q_c-Q_p$ and of configuring an air inlet 301 in the top of the tubing.

6 Claims, 2 Drawing Sheets

(58) Field of Classification Search
USPC .............................................................. 141/1
See application file for complete search history.

(56) References Cited

U.S. PATENT DOCUMENTS

| | | | | |
|---|---|---|---|---|
| 2005/0000590 | A1* | 1/2005 | Benjey .................. | B60K 15/04 141/302 |
| 2013/0193140 | A1* | 8/2013 | Hagano ................. | B60K 15/04 220/86.2 |
| 2013/0213364 | A1* | 8/2013 | Koukan ................. | F02M 25/08 123/518 |
| 2016/0215713 | A1 | 7/2016 | Dudar et al. | |
| 2022/0333557 | A1 | 10/2022 | Dudar | |

* cited by examiner

STRUCTURAL OPTIMIZATION METHOD FOR A FUEL SYSTEM FILLING ASSEMBLY

1. FIELD OF THE INVENTION

The invention relates to a method for structural optimization of a fuel system filling assembly and to a structure of a fuel system filling assembly obtained by the optimization method according to the invention.

More particularly, the invention relates to a fuel system filling assembly comprising a structure obtained by the structural optimization method according to the invention.

2. SOLUTIONS OF THE PRIOR ART

A major problem associated with filling a fuel system on board a vehicle has always been the emission of fuel vapors into the atmosphere during the filling process. Typically, a filling assembly for a fuel system on board a vehicle comprises a top of the tubing open to the atmosphere. When filling the fuel system, the flow of fuel out of the filling gun is such that it creates a negative pressure which draws air from the atmosphere, thus preventing the emission of fuel vapors into the atmosphere.

Under particular conditions, the air intake from the atmosphere may be excessive, due in particular to a high fuel flow rate during filling, resulting in an excessive fuel vapor load on the fuel vapor filter (or canister). In vehicles with combustion engines, the canister filters fuel vapors escaping from the tank into the atmosphere. It contains activated carbon, which adsorbs the hydrocarbon molecules contained in fuel vapors. U.S. Pat. No. 6,170,538 B1 discloses an example of a fuel system comprising such a filtration device.

To reduce the load on the canister during filling, one solution is to increase the recirculation of fuel vapors within the fuel system via a vent line fluidically connecting the fuel tank to the top of the tubing. This recirculation of fuel vapors via the top of the tubing during filling reduces the quantity of fuel vapors sent to the canister, thereby reducing its fuel vapor load. However, such a solution does not prevent the release of fuel vapors into the atmosphere. In fact, at low filling rates, fuel vapors are emitted into the atmosphere from the top of the tubing during filling, due to the low flow rate of the recirculated fuel vapors.

Another proposed solution is the introduction of a mechanical seal within the top of the tubing. The presence of this mechanical seal prevents air from being drawn into the top of the tubing from the atmosphere, since the mechanical seal has to be associated with a vent line fluidically connecting the fuel tank to the top of the tubing, said vent line having a low pressure drop to enable proper filling. Unfortunately, the use of such a mechanical seal poses the problem of the durability of the mechanical seal and requires a fuel system architecture including specific sizing of the vent line fluidically connecting the fuel tank to the top of the tubing.

3. OBJECTIVES OF THE INVENTION

The invention aims in particular to overcome these disadvantages of the prior art.

More precisely, an objective of the invention, in at least one of its embodiments, is to provide a method for structural optimization of a fuel system filling assembly.

Another aim of the invention, in at least one of its embodiments, is to provide a structure for a fuel system filling assembly.

The invention, in at least one of its embodiments, further aims to provide a filling assembly for a fuel system.

4. SUMMARY OF THE INVENTION

In accordance with a particular embodiment, the invention relates to a method for structurally optimizing a fuel system filling assembly, said filling assembly comprising a filling gun comprising at least one catch and a gripping area, a top of the tubing comprising a partition wall comprising an insertion channel configured to receive the filling gun therein, said partition wall separating a first atmosphere-side chamber and a second tank-side chamber, a fuel tank, a fuel line fluidically connecting the fuel tank to the top of the tubing, a first vent line fluidically connecting the tank to a a fuel vapor filtration device, a second vent line fluidically connecting the fuel tank to the top of the tubing.

According to the invention, such a method for structural optimization of the fuel system filling assembly comprises the following steps:

- Filling the fuel system using the filling assembly, with a liquid flow rate $Q_p$ of between 15 and 38 L/min,
- Measuring a gas flow, $Q_c$, at the outlet of the fuel vapor filtration device,
- Measuring a gas flow to the top of the tubing, $Q_r$, within the second vent line fluidically connecting the fuel tank to the top of the tubing,
- Calculating a gas flow rate from the fuel tank, $Q_d$, using the relationship (I):

$$Q_d = Q_c + Q_r \tag{I}$$

- Determining an air flow rate entering the fuel system through the top of the tubing, $Q_a$, using the relationship (II):

$$Q_a = Q_c - Q_p \tag{II}$$

- configuring an air inlet in the top of the tubing, said configuration being carried out according to the following steps:
- Sealing the top of the tubing on the tank side,
- Insertion of the filling gun into the top of the tubing through the insertion channel, with at least one gun catch being inserted and positioned into the top of the tubing and held therein in a filling position, preferentially in a filling position such that a plane of the gun gripping area, preferentially the median plane of the gun gripping area, is oriented perpendicular to the ground,
- Sucking air through the second vent line at a suction flow rate threshold value of between 10 and 40 L/min, preferentially the suction flow rate threshold value is equal to 28 L/min,
- Measuring the pressure, preferentially with a differential pressure sensor, in the top of the tubing, preferentially in the second chamber on the tank side,
- Configuring an air inlet connecting the top of the tubing to the atmosphere so as to obtain a pressure drop of between 1 and 100 mbar between the second chamber on the tank side and the atmosphere, said configuration being made in the top of the tubing at the gun.

The general principle of the invention is based on a method for structurally optimizing a fuel system filling assembly using gas flow measurements within the fuel system when filling the fuel system with the filling assembly at a given flow rate and configuring an air inlet connecting the top of the tubing to the atmosphere so as to optimize the suction of air within the top of the tubing during filling, reduce fuel vapor emissions to the canister, and reduce fuel vapor emissions to the atmosphere via the top of the tubing.

Thus, the invention is based on a completely new and inventive approach to structural optimization of a fuel system filling assembly. The method for structural optimization of a fuel system filling assembly according to the invention constitutes an effective method for the development of improved fuel vapor management during fuel system filling within an existing or developing fuel system filling assembly architecture. It also optimizes the ergonomics of the filling assembly, particularly when the characteristics of the mechanical seal present in the top of the tubing can complicate end-user ergonomics, especially at low temperatures.

The phrase "method for structural optimization of a fuel system filling assembly" means a method that enables the development of the structure of a fuel system filling assembly, said method enabling the creation of a filling assembly that prevents fuel vapors from escaping via the top of the tubing.

The phrase "insertion of the filling gun into the top of the tubing through the insertion channel, with at least one gun catch being inserted and positioned in the top of the tubing and held therein in a filling position" means that the filling gun is inserted into the top of the tubing and held in a "normal filling" position as defined in ISO 13331.

The phrase "sealing the top of the tubing on the tank side" refers to the sealing of the fuel line that fluidically connects the fuel tank to the top of the tubing between the filler-gun insertion area and the fuel tank.

The phrase "said configuration being made in the top of the tubing at the gun" means that the configuration of the air inlet is carried out in a zone of the top of the tubing close to the gun such as, for example, in the insertion channel and/or the separating wall.

The phrase "a first atmosphere-side chamber and a second tank-side chamber" mean a first area located in the top of the tubing on the side of the partition wall, oriented toward the atmosphere, and a second area on the tank side of the partition wall, oriented toward the tank side, preferentially the first area and/or the second area adjoining the partition wall.

The term "pressure drop between 1 and 100 mbar between the second chamber and the atmosphere" refers to the fact that the pressure within the second chamber is 1 to 100 mbar lower than atmospheric pressure.

The expression "a fuel line fluidically connecting the fuel tank to the top of the tubing", we also mean a manifold fluidically connecting the fuel tank to the top of the tubing.

Advantageously, the method for structural optimization of a filling assembly of a fuel system according to the invention is such that it comprises a step of modifying at least one passage section of the second vent line fluidically connecting the tank to the top of the tubing so as to obtain a value of $Q_a$ such that: $0<Q_a<0.2Q_p$.

Thus, the step of modifying at least one passage section of the second vent line fluidically connecting the tank to the top of the tubing further reduces fuel vapor emissions via the top of the tubing and avoids further loading the canister with fuel vapor during filling.

According to a preferred embodiment, the method for structural optimization of a filling assembly of a fuel system according to the invention is such that the step of filling the fuel system by means of the filling assembly at a liquid flow rate $Q_p$ between 15 and 38 L/minute is carried out with a liquid of density, $D_l$, kinematic viscosity $V_c$ and vapor pressure, also called Reid Vapor Pressure (RVP), such that:

$0.9\times\text{fuel density}\leq D_l\leq 1.1\times\text{fuel density}$.

$0.5\times\text{kinematic viscosity of fuel}\leq V_c\leq 4\times\text{kinematic viscosity of fuel}$ Reid Vapor Pressure (RVP)≤0.1 kPa This way, the use of such a liquid makes it possible to reproduce fuel system filling conditions as closely as possible, without excessive fuel vapor generation on filling interfering with gas flow measurements and calculations.

According to an advantageous implementation, the method for structural optimization of a filling assembly of a fuel system according to the invention is such that the step of configuring an air inlet in the top of the tubing comprises a step of cutting a through-hole in the top of the tubing within the partition wall. In one example, the step of cutting a through-hole in the top of the tubing within the partition wall is a step of drilling right through said partition wall, for example, using a drill bit.

In this way, the step of cutting a through-hole in the top of the tubing within the partition wall makes it easier to configure an air inlet within the top of the tubing.

According to an advantageous implementation of the preceding embodiment, the method for structural optimization of a fuel system filling assembly according to the invention is such that the step of cutting a through-hole in the top of the tubing within the partition wall is carried out in the region of the filling gun insertion channel.

The phrase "the step of cutting a through-hole in the top of the tubing within the partition wall is carried out in the region of the filling gun insertion channel" means that the through-hole is located no more than 10 cm away from the center of a cross-section of the insertion channel.

Thus, a step of cutting a through-hole in the top of the tubing within the partition wall carried out in the region of the filling gun insertion channel makes it easier to cut said through-hole.

According to an advantageous implementation of the preceding embodiment, the method for structural optimization of a fuel system filling assembly according to the invention is such that the the method for structural optimization of a fuel system filling assembly according to the invention is such that the step of cutting a through-hole in the top of the tubing is carried out in a direction parallel to the gun insertion channel.

For example, by cutting a through-hole in the top of the tubing in a direction parallel to the gun insertion channel, the size of the through-hole can be optimized.

According to an advantageous implementation, the method for structural optimization of a fuel system filling assembly according to the invention is such that the step of configuring an air inlet comprises installing a means of reducing a section of the gun insertion channel, said reducing means comprising a deformable body.

Thus, the provision of an air inlet by using a means of reducing a cross-section of the gun insertion channel in the form of a reduction means comprising a deformable body makes it possible to avoid a step of cutting a through-hole or else to improve the effect of the through-hole in terms of reducing fuel vapor emissions via the top of the tubing during filling.

The term "deformable body" refers to a body configured to deform when the filling gun is inserted into the insertion channel and to return to its initial position when the gun is withdrawn from the insertion channel.

According to an advantageous implementation of the preceding embodiment, the method for structural optimization of a filling assembly of a fuel system according to the invention is such that the deformable body is selected from the group consisting of a brush comprising a ring whose bristles are directed towards the center of the ring and a ring comprising a system of flaps of trapezoidal shape directed towards the center of the ring.

According to an advantageous implementation, the method for structural optimization of a fuel system filling assembly according to the invention is such that it comprises a step of optimizing the position of the inlet of the second vent line in the top of the tubing.

In this way, optimizing the position of the inlet to the second vent line in the top of the tubing enables recirculated vapors to be sucked back through the tubing, via the negative pressure generated by the flow of fuel leaving the gun, and thus offers the possibility of further recirculating fuel vapors without risking emissions through the top of the tubing during filling.

The invention also relates to the structure of a fuel system filling assembly obtained by the optimization method according to the invention, and to a fuel system filling assembly comprising the structure according to the invention.

5. LIST OF FIGURES

Other features and advantages of the invention will become more clearly apparent on reading the following description of a preferred embodiment, given by way of simple, illustrative and non-limiting example, and from the appended drawings, among which:

6. DESCRIPTION OF AT LEAST ONE EMBODIMENT OF THE INVENTION

Figure 1:
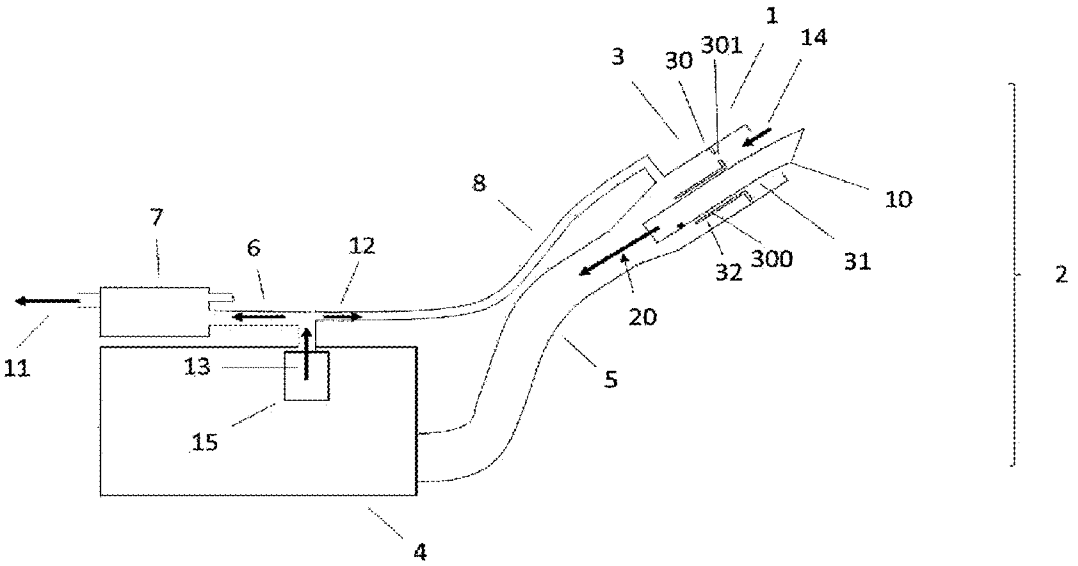
FIG. 1 shows a cross-section of a fuel system filling assembly being filled.

Referring to FIG. 1, an example is shown of how to implement the structural optimization method for a filling assembly 1 of a fuel system 2 according to the invention. FIG. 1 shows a filling assembly 1 of a fuel system 2 comprising a filling gun 10 provided with at least one catch and a gripping area (not shown), a top of the tubing 3 comprising a separating wall 30 including an insertion channel 300 configured to receive the filling gun 10 therein, said wall separating a first chamber 31 located on the atmosphere side and a second chamber 32 located on the fuel tank 4 side, a fuel tank 4, a fuel line 5 fluidically connecting the fuel tank 4 to the top of the tubing 3, a first vent line 6 fluidically connecting the tank 4 to a fuel vapor filtration device 7, a second vent line 8 fluidically connecting the fuel tank 4 to the top of the tubing 3. More precisely, FIG. 1 shows the steps of:

- Filling the fuel system 2 using the filling unit 1, with a flow rate of a liquid shown by the arrow 20, $Q_p$, of between 15 and 38 L/minute, preferentially the liquid used is a liquid whose density, $D_l$, kinematic viscosity Ve and vapor pressure or Reid Vapor Pressure (RVP) are such that:
  - 0.9×fuel density≤$D_l$≤1.1×fuel density.
  - 0.5×kinematic viscosity of fuel≤$V_c$≤4×kinematic viscosity of fuel
  - Reid Vapor Pressure (RVP)≤0.1 kPa.
- Measuring a gas flow rate shown by the arrow 11, $Q_c$, at the outlet of the fuel vapor filter 7,
- Measuring a gas flow to the top of the tubing shown by the arrow 12, $Q_r$, within the second vent line 8 fluidically connecting the fuel tank 4 to the top of the tubing 3, The gas flow rate leaving the fuel tank shown by arrow 13, $Q_d$, is then calculated using the relationship (I) by adding the measured values of the gas flow rate 11, $Q_c$, at the outlet of the fuel vapor filtration device 7 and the gas flow rate to the top of the tubing 12, $Q_r$, within the second vent line fluidically connecting the fuel tank 4 to the top of the tubing 3:

$$Q_d = Q_c + Q_r \tag{I}$$

The air flow rate, $Q_a$, shown by arrow 14, entering the fuel system through the top of the tubing 3, is determined using relationship (II):

$$Q_a = Q_c - Q_p \tag{II}$$

It can be seen that the fuel tank 4 is fitted with an end-of-filling device 15, such as a fill-limit vent valve or FLVV (Fill Limit Vent Valve) or FLV (Fill Limit Valve) 15.

Figure 2:
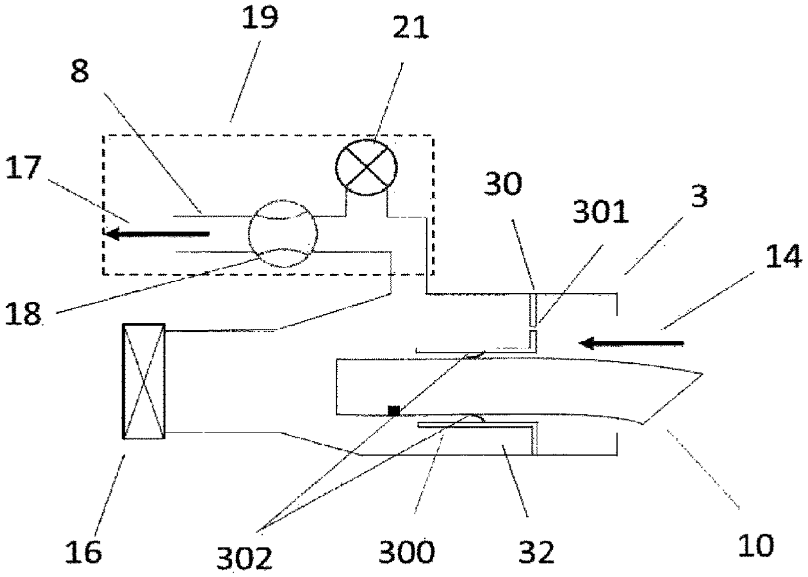
FIG. 2 shows a cross-section of the fuel system filling assembly shown in FIG. 1 during the step of configuring an air inlet.

FIG. 2 shows the step of configuring an air inlet 301 in the top of the tubing 3, said configuration being carried out according to the following steps:

- Sealing the top of the tubing on the tank side 16,
- Inserting the filling gun 10 into the top of the tubing 3 through the insertion channel 300, with at least one catch of the filling gun 10 being inserted into the top of the tubing 3 and held therein in a filling position,
- Sucking air through the second vent line 8 at a suction flow rate threshold value shown by arrow 17, $Q_{asp}$, of between 10 and 40 L/min, preferentially equal to 28 L/min, measured using a flow meter 18, the second vent line 8 being placed in a flow/pressure bench 19 and fitted with a pressure sensor 21,
- Measuring the pressure, preferentially with a differential pressure transducer, in the top of the tubing 3 on the fuel tank 4 side of the partition wall 30, preferentially in the second chamber 32 on the fuel tank 4 side of the partition wall 30,
- Configuring an air inlet 301 connecting the top of the tubing 3 to the atmosphere so as to obtain a pressure drop of between 1 and 100 mbar between the second chamber 32 on the tank side and the atmosphere, said configuration being made in the top of the tubing 3 at the gun 10.

The step of configuring an air inlet 301 in the top of the tubing 3 comprises a step of cutting a through-hole in the top of the tubing 3 within the partition wall 30. Preferentially, the step of cutting a through-hole in the top of the tubing 3 within the partition wall 30 is carried out in the region of the insertion channel 300 of the filling gun 10, more preferentially in a direction parallel to the insertion channel 300 of the filling gun 10.

Alternatively or in addition to cutting a through-hole in the top of the tubing 3, the step of providing an air inlet comprises installing a means 302 for reducing a section of the insertion channel 300 of the gun 10, said reduction means 302 comprising a deformable body 303. Preferentially, the deformable body 303 is selected from the group consisting of a brush 304 comprising a ring 305 whose bristles 306 are directed towards the center of the ring and a ring 307 comprising a system of trapezoidal-shaped flaps 308 directed towards the center of the ring as exemplified in FIGS. 3A to 3G. The filling gun 10 is positioned in the top of the tubing 3 in such a way that the distance between the end of the gun 10 and the deformable body 303, both in the free and deformed state, is greater than 22 mm.

Figure 3:
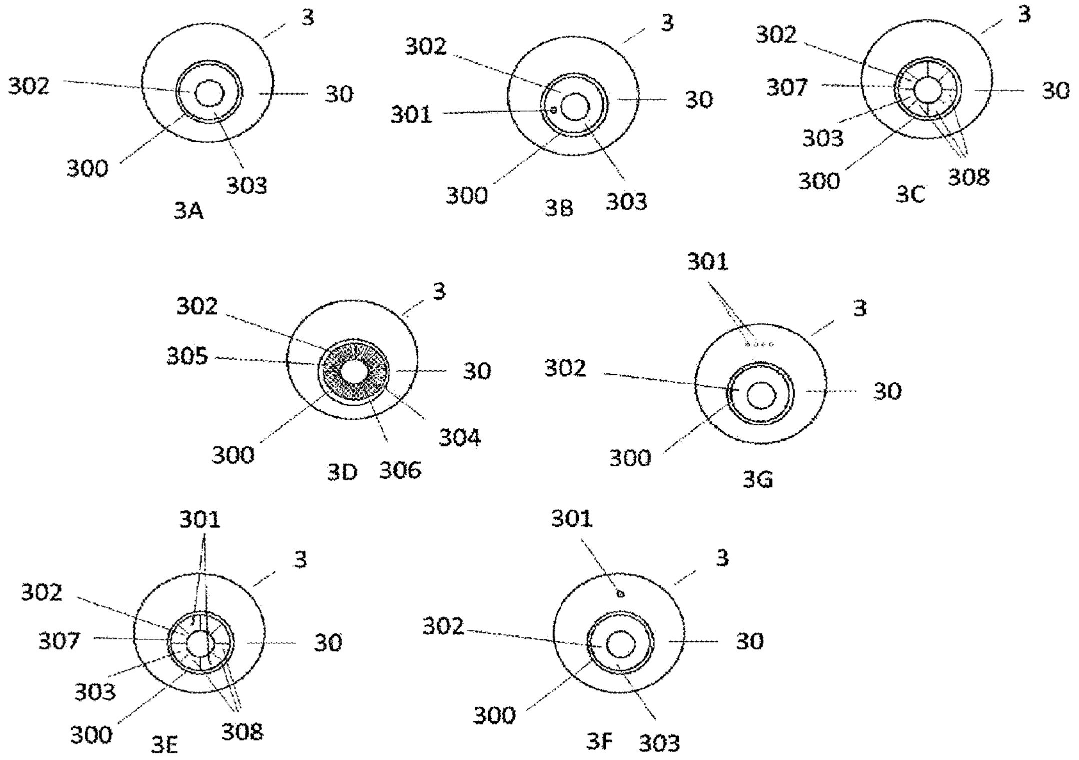
FIG. 3 shows a schematic top view of various examples of air inlet configurations in the top of the tubing.

FIGS. 3A to 3G show a top view of various top of the tubings 3. FIG. 3A shows a top of the tubing 3 comprising a partition wall 30 and means 302 for reducing a section of the gun insertion channel 300, said reducing means 302 comprising a deformable body 303. FIGS. 3B to 3G show top of the tubings 3 with an air inlet. FIG. 3B shows a top of the tubing 3 comprising a partition wall 30 and means 302 for reducing a section of the gun 10 insertion channel 300, said reducing means 302 comprising a deformable body 303. An air inlet 301 in the form of a through-hole is provided in the deformable body 303. FIG. 3C shows a top of the tubing 3 comprising a partition wall 30 and a means 302 for reducing a section of the insertion channel 300 of the gun, said reduction means 302 comprising a deformable body 303 comprising a ring 307 comprising a system of trapezoidal-shaped flaps 308 directed towards the center of the ring. When the gun is inserted, the trapezoidal flaps 308 spread apart, causing air to enter the filling assembly. FIG. 3D shows a top of the tubing 3 comprising a separating wall 30 and a means 302 for reducing a section of the insertion channel 300 of the gun, said reduction means 302 comprising a deformable body 303 comprising a brush 304 comprising a ring 305 whose bristles 306 made of plastic or elastomer fibers are directed towards the center of the ring. The bristles spreading apart when the gun 10 is inserted causes more air to be drawn into the filling assembly 1. FIG. 3E shows a top of the tubing 3 comprising a partition wall 30 and a means 302 for reducing a section of the insertion channel 300 of the gun, said reduction means 302 comprising a deformable body 303 comprising a ring 307 comprising a system of trapezoidal-shaped flaps 308 directed towards the center of the ring. Spreading the trapezoidal flaps 308 apart when the gun 10 is inserted causes air to enter the filling assembly 1. An air inlet 301 in the form of through-holes is also provided in the deformable body 303 at the trapezoidal flaps 308. FIG. 3F shows a top of the tubing 3 comprising a partition wall 30 and means 302 for reducing a section of the gun insertion channel 300, said reducing means 302 comprising a deformable body 303. An air inlet 301 in the form of a through-hole 301 has been cut into the partition wall 30. FIG. 3G shows a top of the tubing 3 comprising a partition wall 30 and means 302 for reducing a section of the gun insertion channel 300, said reducing means 302 comprising a deformable body 303. An air inlet 301 in the form of a plurality of through-holes 301 has been cut into the partition wall 30.

The invention claimed is:

1. A method for structural optimization of a filling assembly of a fuel system,
- said filling assembly comprising
  - a filling gun,
  - a top of a tubing having an opening configured to receive the filling gun therein,
  - a separating wall positioned within the tubing and spaced apart from the opening,
  - the separating wall comprising an insertion channel configured to receive the filling gun therein,
  - said wall separating a first chamber located on the atmosphere side and a second chamber located on the tank side,
  - a fuel tank,
  - a fuel line fluidically connecting the fuel tank to the tubing,
  - a first vent line fluidically connecting the tank to a fuel vapor filtration device,
  - a second vent line fluidically connecting the fuel tank to the tubing,
- said method for structural optimization of a filling assembly of a fuel system comprising the following steps:
  - filling the fuel system using the filling assembly, with a liquid flow rate Q, of between 15 and 38 L/minute,
  - configuring an air inlet within the tubing, said configuration being carried out according to the following steps:
    - sealing the tubing on the tank side,
    - inserting the filling gun into the opening the tubing and through the insertion channel,
  - sucking air through the second vent line, from the tubing into the fuel tank, at a suction flow rate threshold value of between 10 and 40 L/min,
  - measuring the pressure within the tubing,
  - configuring an air inlet connecting the tubing to the atmosphere so as to obtain a pressure drop of between 1 and 100 mbar between the second chamber on the tank side and the atmosphere,
    - said configuration being made in the tubing at the gun by cutting a through-hole in the separating wall, the through-hole in the separating wall being spaced apart from the opening of the tube in a direction of insertion of the filling gun,
    - wherein the cutting is carried out in the region of the insertion channel of the filling gun and in a direction parallel to the insertion channel of the filling gun.

2. The method of structurally optimizing a filling assembly of a fuel system according to claim 1, such that the step of providing the air inlet connecting the tubing to the atmosphere comprises installing means for reducing a section of the insertion channel of the gun, said reducing means comprising a deformable body.

3. The method for structural optimization of a filling assembly of a fuel system according to claim 2, such that the deformable body is selected from the group consisting of a brush comprising a ring whose bristles are directed towards the center of the ring and a ring comprising a system of trapezoidal-shaped flaps directed towards the center of the ring.

4. The method for structural optimization of a filling assembly of a fuel system according to claim 1, such that it comprises a step of optimizing the position of an inlet of the second vent line in the top of the tubing.

5. A structure of a filling assembly of a fuel system obtained by the optimization method according to claim 1.

6. A filling assembly for a fuel system comprising the structure of claim 5.

* * * * *